United States Patent [19]

Dougherty et al.

[11] Patent Number: 5,078,672
[45] Date of Patent: Jan. 7, 1992

[54] TIN (II) STABILIZER FOR HYDROGEN PEROXIDE

[75] Inventors: Edward F. Dougherty, League City, Tex.; Quentin G. Hopkins, Downington, Pa.; James E. Sanborn, Houston, Tex.; A. Thomas Weibel, Cranbury, N.J.

[73] Assignee: FMC Corporation, Philadelphia, Pa.

[21] Appl. No.: 572,591

[22] Filed: Aug. 27, 1990

[51] Int. Cl.$^5$ .................... B01D 43/00; C01B 15/01; C01B 15/037
[52] U.S. Cl. .................................... 494/37; 423/273; 423/584
[58] Field of Search ............... 423/272, 273, 584; 23/293 R; 494/37

[56] References Cited

U.S. PATENT DOCUMENTS

| | | | |
|---|---|---|---|
| 2,004,809 | 6/1935 | Gilbert et al. | 23/251 |
| 2,086,123 | 7/1937 | Eisenman | 423/272 |
| 2,658,818 | 11/1953 | Shanley et al. | 23/207.5 |
| 3,107,151 | 10/1963 | Hauschild | 23/207 |
| 3,429,666 | 2/1969 | Morris et al. | 23/207.5 |
| 4,534,945 | 8/1985 | Hopkins et al. | 423/272 |
| 4,812,173 | 3/1989 | Tsao et al. | 134/27 |

FOREIGN PATENT DOCUMENTS

| | | | |
|---|---|---|---|
| 1129462 | 5/1962 | Fed. Rep. of Germany | 423/588 |
| 154842 | 8/1985 | Japan | 423/272 |
| 2085862 | 5/1982 | United Kingdom | 423/272 |

OTHER PUBLICATIONS

John H. Perry, *Chemical Engineers' Handbook*, Fourth Edition (1963), McGraw-Hill Book Co., pp. 19-86, 19-87.

Bellinger et al., "Chemical Propellants", Ind. & Eng. Chem., Mar. 1946, pp. 310-320.

*Primary Examiner*—Wayne A. Langel

[57] ABSTRACT

A method for stabilizing hydrogen peroxide and the stabilized composition are claimed employing as a stabilizer a tin (II) salt of an acid selected from the group hydrofluoric acid, C6 to C17 saturated monocarboxylic acids and C2 to C6 saturated polycarboxylic acids, preferably oxalic acid. The tin content of hydrogen peroxide prepared from a tin (II) oxalate stock solution can be reduced by filtration to less than 1 mg/l if the tin oxalate stock solution has been properly aged.

8 Claims, No Drawings

TIN (II) STABILIZER FOR HYDROGEN PEROXIDE

The invention is a method for stabilizing hydrogen peroxide against decomposition and the stabilized hydrogen peroxide composition.

Pure hydrogen peroxide is a very stable compound, however, in the presence of even traces of many transition metals, such as iron, copper and the like, it will decompose into oxygen gas and water. When manufactured, hydrogen peroxide is substantially free from such decomposition catalysts. However, it is considered necessary to protect hydrogen peroxide from accidental contamination during shipping and storage with a stabilizer.

Clear colloidal tin sols formed from sodium stannate or other tin compounds have long been known as effective stabilizers for hydrogen peroxide and Schumb et al. review their application in detail. The optimum tin concentration for 85 percent hydrogen peroxide is reported by Schumb et al. to be 0.83 mg $SnO_2/l$ for 0.1 mg/l ferric iron.

It is well known that aluminum metal and aluminum ions do not decompose hydrogen peroxide catalytically. However, the presence of aluminum ions causes tin sols to precipitate from hydrogen peroxide. U.S. Pat. No. 3,356,457 to Morris et al. teaches that a maximum 0.2 mg/l aluminum can be present in a tin-stabilized hydrogen peroxide formulation. However, in the presence of a phosphate stabilizer the tin-stabilized peroxide can tolerate up to 1 mg/l aluminum ion without precipitating.

In U.S. Pat. No. 3,234,140 to Irani amino tris(methylenephosphonic acid) is taught as a stabilizer for hydrogen peroxide solutions when the phosphonic acid is present in concentrations from about 0.001% to about 5%. U.S. Pat. No. 3,383,174 to Carnine et al. teaches a synergistic combination of 50 to 300 mg/l amino tris(methylenephosphonic acid) with 10 to 150 mg/l of tin added as sodium stannate U.S. Pat. No. 3,861,022 to Kibbel et al. discloses 35 percent hydrogen peroxide formulations containing 300 mg/l of tin in the form of a soluble alkali metal salt, such as sodium stannate and solubilized by 1250 mg/l amino tris(methylenephosphonic acid).

For many applications, such as reagent chemical and semiconductor uses the high concentrations of stabilizer taught to be necessary by the prior art are unacceptable. For example, the ACS specification for reagent hydrogen peroxide calls for a maximum residue after evaporation of 20 mg/l for hydrogen peroxide which assays between 29.0 and 32.0 percent. It is well known that the tin compounds used to stabilize hydrogen peroxide are in the form of colloidal stannic oxide particles which can be coagulated and neutralized by positive ions, such as calcium, magnesium, and aluminum, as well as common decomposition catalysts.

Negative ions such as pyrophosphates, phosphates and sulfates are known to improve the stability of colloidal stannic oxide. However, the quantities of these materials, which are the critical minimum according to the prior art, cannot be used for ACS reagent hydrogen peroxide because a maximum of 2 mg/l phosphorus as phosphate and 5 mg/l of sulfate is specified.

Alkali metal ions such as sodium or potassium have no observable adverse effect on the stability of hydrogen peroxide solutions. Consequently, tin stabilizers are usually incorporated into the hydrogen peroxide solutions as sodium stannate or potassium stannate.

However, for applications involving semiconductors even alkali metal ions may be undesirable, and it is generally preferred that the hydrogen peroxide be substantially free of all metal compounds, including tin stabilizers.

The present invention overcomes the problems of the prior art stabilizers by providing a method for stabilizing hydrogen peroxide against decomposition by a transition metal ion comprising incorporating into the hydrogen peroxide a tin (II) salt of an acid selected from the group consisting of hydrofluoric acid, C6 to C17 saturated monocarboxylic acids and C2 to C6 saturated polycarboxylic acids.

Typical saturated monobasic normal acid portions of the tin salt useful for the present invention are caproic, heptylic, caprylic, pelargonic, capric, undecylic, lauric, myristic, palmitic, stearic and branched chain acids having less than 10 carbons, such as ethylhexanoic acid. Suitable polybasic acids include oxalic, malonic, succinic, glutaric and adipic acids as well as hydroxy polybasic acids such as tartaric and citric acids.

It was surprising to find that a tin (II) salt could be incorporated into hydrogen peroxide as a stabilizer. It was also unexpected to observe that some of the compounds were effective as stabilizers even though they could be separated from the aqueous hydrogen peroxide by centrifuging, decanting or by filtration. Some of the stabilized compositions contained a haze, a turbidity or a floc which probably either are the free acid or a salt of the free acid rather than the tin salt or a tin-containing compound.

Desirably, the tin salt is first incorporated into a stock solution such as an aqueous slurry or solution which subsequently is incorporated into the aqueous hydrogen peroxide. The stock solution may be prepared using water, or aqueous hydrogen peroxide as the liquid and may optionally contain other additives for the hydrogen peroxide, such as acids, buffers, chelating compounds, or agents to modify viscosity, surface tension, or appearance of the hydrogen peroxide. Desirably, the stock solution will contain from about 0.01% to 10% of the tin salt, preferably about 1% to about 5%.

A particularly desirable tin (II) salt is stannous oxalate which has the unexpected property of forming a clear sol or solution in the hydrogen peroxide, but which, when properly aged at 0° C. to 100° C., can be separated into a first liquid part containing less than 1 mg/l tin, and a second, nonfluid portion containing substantially all of the rest of the tin initially added. Aging the stock solution about 10 days at about 25° C. (room temperature) is generally sufficient. However, the time required for aging can be reduced by maintaining the stock solution at an elevated temperature for a period of time. For example, maintaining the stock solution at about 100° C. for 15 minutes reduces the time required for aging to about 24 hours, while maintaining the stock solution at about 100° C. for 1 hour reduces the time required for aging to about 1 to 2 hours or less. One of ordinary skill in the art can easily select the most desirable combination of temperature and time for aging stock solution from the above without undue experimentation.

The hydrogen peroxide to be stabilized may be any convenient concentration. Desirably, the hydrogen peroxide will range from about 6% to about 75% by weight in concentration, more desirably, the hydrogen peroxide will range from about 25% by weight to about 70% by weight. Although concentrations of 1% or less may be stabilized in this manner, such solutions are too dilute for economical shipping.

One skilled in the art will readily recognize that the most desirable amount of tin added to the solution will vary with the concentration of hydrogen peroxide, the potential for contamination of the hydrogen peroxide solution, and the intended use of the hydrogen peroxide. Normally, hydrogen peroxide is shipped to the electronics industry as 30%–50% hydrogen peroxide. It is desirable to incorporate sufficient stabilizer to provide from about 0.1 mg/l tin to about 100 mg/l tin, preferably from about 1 mg/l to about 20 mg/l tin. Most preferably, the stock solution will be prepared employing stannous oxalate (tin II oxalate) which has been aged sufficiently to yield a product containing less than 1 mg/l tin after separating a nonfluid portion from the first liquid portion.

It is intended that the present invention include not only the process for stabilizing hydrogen peroxide, but the stabilized hydrogen peroxide composition.

The best mode of practicing the invention will be clear to one of ordinary skill in the art from the following nonlimiting examples.

Unless otherwise specified, all percent concentrations are as percent by weight.

EXAMPLE 1

Stabilized formulations of 35% hydrogen peroxide were prepared with various stannous salts and optionally amino tris(methylenephosphonic acid) as a chelant as described in Table I. In some runs decomposition catalysts were added as a dopant. A full dopant addition provided 1.2 mg/l each of iron and aluminum, 0.24 mg/l copper, 0.12 mg/l manganese and 0.06 mg/l hexavalent chromium in the hydrogen peroxide. The 24 hour hot stability was determined, following which some samples were decanted or filtered and the clear solution analyzed for tin.

For comparison the stability was determined for the unstabilized hydrogen peroxide (control) and stabilized with 1 mg/l tin as potassium stannate (standard).

Tin was determined on Runs 74-1 through 74-4 immediately after preparation and found to be 0.65, 0.64, 0.36 and 0.20 mg/l respectively. Phosphate in Run 74-2 was 0.75 mg/l after preparation and 0.34 after stability and filtration; for 74-4 the phosphate was 0.53 and 0.34 respectively.

Stannous fluoride and tartrate did not dissolve completely. Stannous fluoride and stearate samples also had a visible haze while flocs or solids settled from samples prepared with stannous tartrate, 2-ethyl hexanoate, caproate and laureate.

EXAMPLE 2

Samples of 35% hydrogen peroxide were prepared as in Example 1 containing 2 mg/l stannous tartrate with and without being doped with the decomposition catalyst at the 1/100 level. Stabilities were run in duplicate before and after filtering through a 0.22 μm filter. Results are presented as Table II.

This example shows poor reproducibility of the stability of samples after filtration which is to be expected because most of thee insoluble stabilizing stannous salt has been removed.

EXAMPLE 3

A series of experiments were designed to determine the reason for inconsistencies in the tin analyses of samples prepared with stannous oxalate. Samples of hydrogen peroxide containing 1 mg/l tin were prepared from stock solution ranging in concentration from 0.5% to 2.0 stannous oxalate and optionally additional oxalic acid. Tin analyses of filtered and unfiltered samples which were freshly prepared and after aging 10 days. Table III surprisingly shows that on aging substantially all the tin could be filtered from the solutions.

The stannous oxalate stock solution was prepared by heating on a steam bath for approximately fifteen (15) minutes. The stannous oxalate-oxalic acid mixtures dissolved within fifteen (15) minutes at ambient temperature. Stannous tartrate could not be dissolved in 35% hydrogen peroxide by heating on a steam bath overnight.

The example shows that aging the stock solution permitted the tin to be filtered from the $H_2O_2$.

EXAMPLE 4

Table IV was designed to determine the time required for the solutions to become filterable. The samples were prepared from a 1% stannous oxalate stock solution, optionally containing 1% oxalic acid.

Each day the stock solutions were used to prepare 35% hydrogen peroxide solutions containing approximately 2 ppm of the stannous compound. The stabilized solutions were filtered through a 0.22 micron filter. The tin contents of the filtered solutions were determined.

EXAMPLE 5

Stock solutions were prepared as in Example 4 except they were treated on a steam bath for 0, 2 or 3 hours. The stock solutions were used to stabilize 35% or 70% hydrogen peroxide either immediately or after 1 day. The hydrogen peroxide samples were filtered and analyzed for tin. Results are presented as Table V.

This example shows that after aging stock solution for 1 hour at 100° C. it is possible to prepare stabilized hydrogen peroxide from which the tin can be removed immediately by filtration or the like.

TABLE I

STABILITY OF 35% $H_2O_2$ WITH AND WITHOUT CONTAMINANTS

| Run No. | Additives Stannous Salt mg/l | Anion | Chelant | % Hot Stability When Doped With Decomposition Catalysts None | Full | 1/10 | 1/100 | mg/l Sn |
|---|---|---|---|---|---|---|---|---|
| Control | None | | | 51.6 | | | | |
| 63-2 | 85 | Palmitate | | | | | 80.4 | |
| 64-1 | 100 | Fluoride | | 99.6 | | | | 1.6 |
| 64-2 | 100 | Fluoride | | | | | 99.2 | |
| 64-3 | 100 | Tartrate | | 99.4 | | | | |
| 64-4 | 100 | Tartrate | | | | | 99.1 | 0.09 |
| 65-1 | 100 | Fluoride | 125 | 83.1 | | | | 32.0** |

TABLE I-continued

STABILITY OF 35% H₂O₂ WITH AND WITHOUT CONTAMINANTS

| Run No. | Additives Stannous Salt mg/l | Anion | Chelant | % Hot Stability When Doped With Decomposition Catalysts None | Full | 1/10 | 1/100 | mg/l Sn |
|---|---|---|---|---|---|---|---|---|
| 65-2 | 100 | Fluoride | | | | 97.9 | | |
| 65-3 | 100 | Tartrate | 125 | | 67.5 | | | |
| 65-4 | 100 | Tartrate | | | | 96.6 | | 0.9** |
| 66-2 | 100 | Oxalate | | | | 98.4 | | 1.90 |
| 66-3 | 100 | Oxalate | 125 | | 87.6 | | | 38.1 |
| 66-4 | 100 | Oxalate | | | | | 99.0 | 33.0 |
| 67-1 | 100 | 2 E Hexanoate | | | | 96.5 | | 0.222 |
| 67-2 | 100 | Stearate | | 96.2 | | | | 0.011 |
| 67-3 | 100 | Caproate | | | | 26.7 | | 0.033 |
| 67-4 | 100 | Laurate | | 83.8 | | | | 0.025 |
| 68-1 | 1 | Tartrate | | 90.4 | | | | 0.039 |
| 68-2 | 1 | Tartrate | | | | | 62.2 | 0.012 |
| 68-3 | 100 | Tartrate | | | | 97.5 | | |
| 69-1 | 100 | Oxalate | | | | 99.0 | | 1.48 |
| 69-2 | 100 | Oxalate | | | | 98.0 | | 1.10 |
| 69-3 | 100 | Tartrate | | | | 98.2 | | 23.7 |
| 69-4 | 100 | Tartrate | | | | 98.6 | | 36.2 |
| 70-1 | 100 | Tartrate | 125 | | 86.5 | | | 46.9 |
| 70-2 | 100 | Oxalate | 125 | | 87.7 | | | 68.0 |
| 70-3 | 2 | Tartrate | | | | | 83.4 | 0.027 |
| 70-4 | 2 | Oxalate | | | | 90.3 | | 0.010 |
| 73-2 | 2 | Oxalate | | 95.3 | | | | 0.033 |
| 73-3 | 2 | Oxalate | | | | 86.0 | | 0.013 |
| 73-4 | 2 | Tartrate | | | | 87.1 | | 0.013 |
| 74-1 | 1 | Oxalate | | 95.3 | | | | 0.010* |
| 74-2 | 1 | Oxalate | 1 | 97.8 | | | | 0.011* |
| 74-3 | 1 | Tartrate | | 96.1 | | | | 0.010* |
| 74-4 | 1 | Tartrate | | 96.7 | | | | 0.020* |
| Standard 1 (Potassium Stannate) | | | | | | | 81.8 | 0.33 |

Note all tin analyses were after filtration through a 0.16 μm filter except those marked
*filtered through a 0.22 μm filter
**solution was decanted from solids.

TABLE II

COMPARISON OF STABILITY OF 35% H₂O₂ BEFORE AND AFTER FILTRATION

| | % Stability Undoped | 1/100 Doped |
|---|---|---|
| Unfiltered | 98.4–97.9 | 86.0–91.1 |
| Filtered | 82.2–96.4 | 81.8–46.3 |

TABLE III

EFFECT OF AGING STOCK SOLUTION ON FILTERING TIN

| Stock Solution Concentration | | Tin Content mg/l | | | |
|---|---|---|---|---|---|
| % Sn Oxalate | % Oxalic Acid | Fresh Stock Soln. Unfiltered | Filtered | Aged Stock Soln. Unfiltered | Filtered |
| 0.5 | 0.0 | 1.14 | 1.08 | 1.20 | <0.03 |
| 0.5 | 0.5 | 1.04 | 1.08 | 1.40 | 0.03 |
| 1.0 | 1.0 | 0.99 | 0.98 | 1.45 | <0.03 |
| 2.0 | 2.0 | 0.98 | 0.99 | 1.51 | <0.03 |

TABLE IV

AGING OF STANNOUS OXALATE STOCK SOLUTION

| Stock Solution mg/l Sn Oxalate | Oxalic Acid | Heated 15 min. | mg/l Tin After Filtering After (Days) 1 | 2 | 3 | 4 | 7 |
|---|---|---|---|---|---|---|---|
| 1 | 0 | Yes | 1.22 | 0:50 | <0.018 | — | — |
| 1 | 0 | Yes | 1.11 | — | — | — | 0.23 |
| 1 | 0 | Yes | 0.61 | <0.018 | | | |
| 1 | 0 | Yes | 1.22 | — | — | <0.017 | — |
| 1 | 1 | No | 2.66 | 0.59 | <0.018 | — | — |
| 1 | 1 | No | 1.36 | — | — | — | 0.126 |
| 1 | 1 | No | 1.34 | 1.31 | <0.018 | — | — |
| 1 | 1 | No | 1.32 | — | — | — | 0.035 |
| 1 | 1 | Yes | 1.05 | 1.04 | <0.018 | — | — |
| 1 | 1 | Yes | 1.17 | — | — | — | <0.012 |

TABLE V

EFFECT OF AGING STANNOUS OXALATE STOCK SOLUTION UP TO THREE HOURS

| Stock Solution % Sn Oxalate | % Oxalic Acid | Hours Heated | mg/l Sn After Filtration After 0 days | After 1 day |
|---|---|---|---|---|
| 1 | 0 | 2 | <0.012 | <0.012 |
| 1 | 0 | 2 | <0.012 | <0.012 |
| 1 | 0 | 2 | 0.013 | <0.012 |
| 1 | 1 | 0 | — | 1.14 |
| 1 | 1 | 0 | — | 1.10 |
| 1 | 1 | 2 | <0.012 | <0.012 |
| 1 | 1 | 2 | <0.12 | — |
| 1 | 0 | 3 | 0.020 | — |
| 1 | 0 | 3 | — | 0.024 |
| 1 | 0 | 3 | 0.023 | — |
| 1 | 0 | 3 | — | 0.014 |
| 1 | 1 | 3 | 0.018 | — |
| 1 | 1 | 3 | — | 0.012 |
| 1 | 1 | 3 | <0.010 | — |
| 1 | 1 | 3 | — | <0.010 |
| 1 | 0 | 3 | <0.010 | — |
| 1 | 0 | 3 | — | <0.010 |
| 1 | 0 | 3 | <0.010 | — |

TABLE V-continued

EFFECT OF AGING STANNOUS OXALATE
STOCK SOLUTION UP TO THREE HOURS

| Stock Solution | | | mg/l Sn After Filtration | |
|---|---|---|---|---|
| % Sn Oxalate | % Oxalic Acid | Hours Heated | After 0 days | After 1 day |
| 1 | 0 | 3 | — | <0.010 |

We claim:

1. A method for stabilizing hydrogen peroxide against decomposition by a transition metal ion comprising incorporating into the hydrogen peroxide a tin (II) salt of a C2 to C6 saturated polycarboxylic acid.

2. The method of claim 1 wherein the acid is oxalic acid.

3. The method of claim 1 wherein the acid is tartaric acid.

4. The method of claim 2 wherein the stannous oxalate salt is incorporated into the hydrogen peroxide by the steps of:

(a) incorporating a sufficient quantity of the stannous oxalate salt into a stock solution to provide from about 0.01% to about 10% by weight in said stock solution, (b) aging said stock solution for from about 5 minutes to about 6 months at a temperature of about 0° C. to about 100° C., and (c) incorporating sufficient aged stock solution from step (b) into a 6% to 70% solution of aqueous hydrogen peroxide to provide about 1 to about 20 mg/l tin in said hydrogen peroxide.

5. The method of claim 4 wherein the hydrogen peroxide from step (c) is filtered, thereby providing a first fluid portion of hydrogen peroxide containing less than 1 mg/l tin.

6. The composition produced by claim 4.

7. The composition produced by claim 5.

8. Centrifuging said stabilized hydrogen peroxide from claim 4(c) into a first fluid, portion, and a second, nonfluid portion, said first fluid portion containing less than 1 mg/l tin.

* * * * *